US012592441B2

(12) United States Patent
Jaradi et al.

(10) Patent No.: US 12,592,441 B2
(45) Date of Patent: Mar. 31, 2026

(54) VIBRATION ISOLATORS FOR ELECTRIC VEHICLE-BATTERY ENCLOSURE

(71) Applicant: Ford Global Technologies, LLC, Dearborn, MI (US)

(72) Inventors: Dean M. Jaradi, Macomb, MI (US); Mohammad Omar Faruque, Ann Arbor, MI (US); S.M. Iskander Farooq, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 275 days.

(21) Appl. No.: 18/449,279

(22) Filed: Aug. 14, 2023

(65) Prior Publication Data

US 2025/0062471 A1 Feb. 20, 2025

(51) Int. Cl.
*H01M 50/242* (2021.01)
*B60L 50/64* (2019.01)
*H01M 50/249* (2021.01)

(52) U.S. Cl.
CPC ........... *H01M 50/249* (2021.01); *B60L 50/64* (2019.02); *H01M 50/242* (2021.01); *H01M 2220/20* (2013.01)

(58) Field of Classification Search
CPC ............. H01M 50/249; H01M 50/242; H01M 2220/20; B60L 50/64
See application file for complete search history.

(56) References Cited

U.S. PATENT DOCUMENTS

| | | | |
|---|---|---|---|
| 10,497,998 B2 | 12/2019 | Milton et al. | |
| 2003/0162091 A1* | 8/2003 | Watanabe ........... | H01M 50/124 |
| | | | 429/156 |
| 2012/0256582 A1* | 10/2012 | Kim ..................... | H01M 10/46 |
| | | | 320/101 |
| 2017/0054119 A1* | 2/2017 | Lee ..................... | H01M 10/647 |
| 2023/0044178 A1 | 2/2023 | Bohmer et al. | |

FOREIGN PATENT DOCUMENTS

| | | | |
|---|---|---|---|
| CN | 109955704 A | 7/2019 | |
| CN | 211125748 U | 7/2020 | |
| CN | 115548555 A | 12/2022 | |
| GB | 2328264 A * | 2/1999 | .............. F16F 7/108 |

OTHER PUBLICATIONS

"Sealing of Battery Housings," Sanderhoff System Solutions, 2022, 16 pages.

* cited by examiner

*Primary Examiner* — Tisha D Lewis
(74) *Attorney, Agent, or Firm* — Frank A. MacKenzie; Brooks Kushman P.C.

(57) ABSTRACT

A vehicle includes a vehicle-battery enclosure including an upper plate and a lower plate spaced downwardly from the upper plate. The vehicle includes a vehicle battery between the upper plate and the lower plate. The vehicle includes vibration isolators, including a first vibration isolator and a second vibration isolator, between the vehicle-battery enclosure and the vehicle battery. The first vibration isolator is between the vehicle battery and the upper plate. The second vibration isolator is between the vehicle battery and the lower plate. Each of the vibration isolators includes a coil spring and a molded portion encasing the coil spring. The molded portion is elastomeric polymer.

20 Claims, 6 Drawing Sheets

VIBRATION ISOLATORS FOR ELECTRIC VEHICLE-BATTERY ENCLOSURE

BACKGROUND

A battery-electric vehicle includes one or more batteries that power the vehicle, including propulsion of the vehicle. For example, wheels of the vehicle are powered by electric motors that are powered by the batteries. The battery is stored in a vehicle-battery compartment, e.g., a vehicle-battery tray and/or vehicle-battery enclosure that may be, for example, under a passenger compartment of the vehicle. In such an example, the vehicle-battery compartment may span the entire cross-vehicle width of the vehicle underbody.

DETAILED DESCRIPTION

Figure 1:
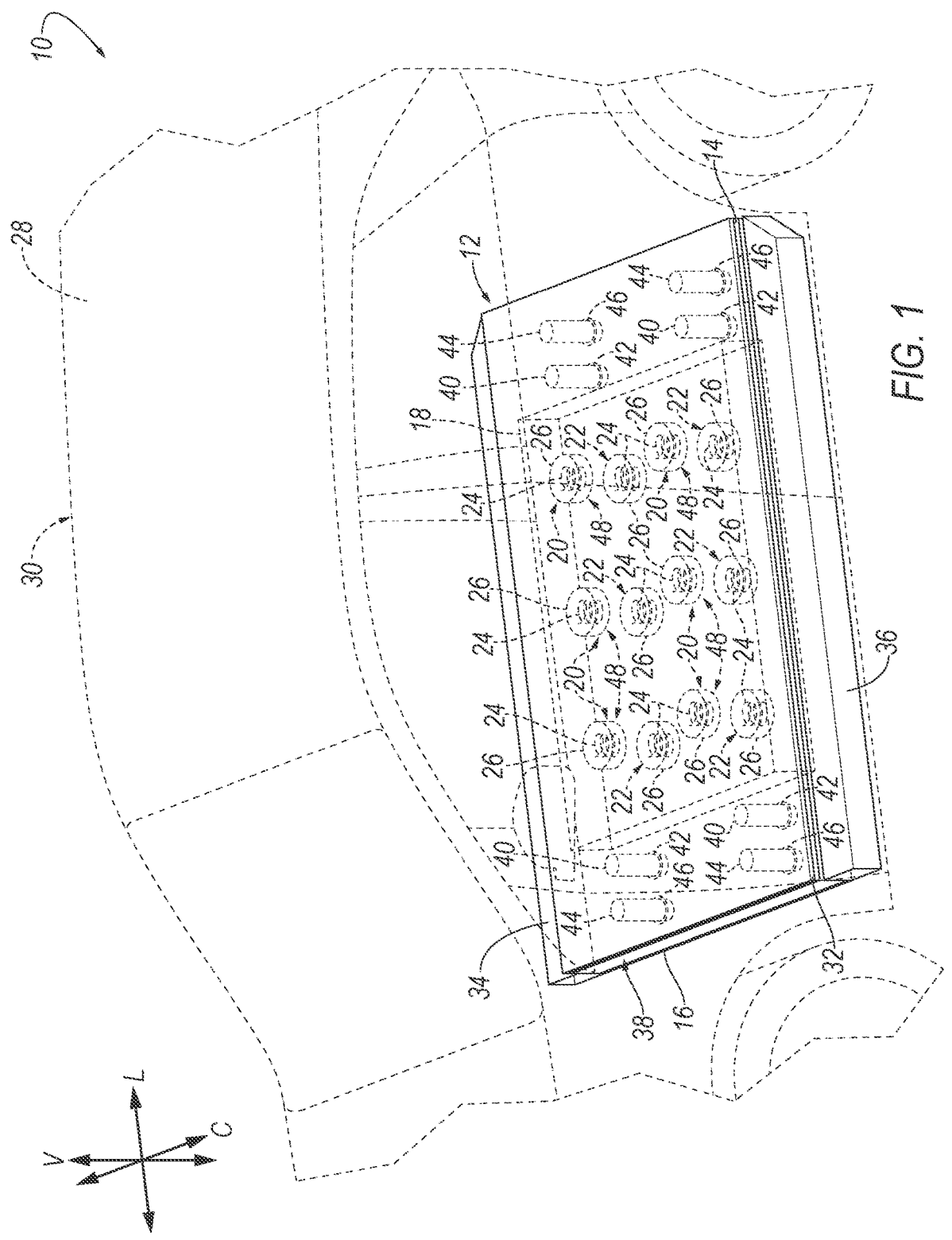
FIG. 1 is a perspective view of a vehicle having a vehicle-battery enclosure.

A vehicle includes a vehicle-battery enclosure including an upper plate and a lower plate spaced downwardly from the upper plate. The vehicle includes a vehicle battery between the upper plate and the lower plate. The vehicle includes vibration isolators, including a first vibration isolator and a second vibration isolator, between the vehicle-battery enclosure and the vehicle battery. The first vibration isolator is between vehicle battery and the upper plate. The second vibration isolator is between the vehicle battery and the lower plate. Each of the vibration isolators includes a coil spring and a molded portion encasing the coil spring. The molded portion is elastomeric polymer.

The molded portions of the vibration isolators may define a cavity. The coil springs may be inside the cavities, respectively.

Each cavity may have a side wall terminating at an upper end and a lower end and surrounding the coil spring. The respective coil spring may have an upper end and a lower end. The upper end and lower end of the coil spring may be between the upper end and the lower end of the cavity.

The coil springs may be overmolded by the molded portions, respectively.

The molded portion of the first vibration isolator may be between the upper plate and the coil spring of the first vibration isolator and the molded portion of the second vibration isolator may be between the lower plate and the coil spring of the second vibration isolator.

The vehicle-battery enclosure may define a vehicle-battery compartment between the upper plate and the lower plate. The molded portions of the vibration isolators may be between the vehicle-battery compartment and the coil springs of the vibration isolators.

The molded portions of the vibration isolators may abut the vehicle-battery enclosure and the vehicle battery.

The molded portion of the first vibration isolator may abut the upper plate and the vehicle battery and the molded portion of the second vibration isolator abuts the lower plate and the vehicle battery.

The vehicle may include a first pair of vibration isolators, including the first vibration isolator and the second vibration isolator, and a second pair of vibration isolators spaced from the first pair of vibration isolators. The second pair of vibration isolators may be between the vehicle-battery enclosure and the vehicle battery.

The second pair of vibration isolators may be spaced cross-vehicle from the first pair of vibration isolators.

The second pair of vibration isolators may be spaced along a vehicle-longitudinal axis from the first pair of vibration isolators.

The vibration isolators may be in compression between the vehicle battery and the vehicle-battery enclosure.

The vehicle may include a fastener between the upper plate and the lower plate. The vibration isolators may be in compression by the fastener.

The vehicle battery may be suspended between the upper plate and the lower plate by vibration isolators.

The vehicle may include a vehicle floor. The upper plate may be between the vehicle floor and the first vibration isolator.

The first vibration isolator may be between the vehicle battery and the vehicle floor and the vehicle battery may be between the vehicle floor and the second vibration isolator.

The vehicle may include a fastener between the upper plate and the lower plate and a fastener between the vehicle-battery enclosure and the vehicle floor. The vibration isolators may be in compression by the fasteners.

The fasteners may be spaced from the vibration isolators and the vehicle battery.

The vehicle may include a second fastener between the upper plate and the lower plate and a second fastener between the vehicle-battery enclosure and the vehicle floor.

The vehicle battery and the vibration isolators may be between the fastener and the second fastener and the vibration isolators may be between the fastener and the second fastener.

With reference to the Figures, wherein like numerals indicate like parts throughout the several views, a vehicle 10 includes a vehicle-battery enclosure 12 including an upper plate 14 and a lower plate 16 spaced downwardly from the upper plate 14. The vehicle 10 includes a vehicle battery 18 between the upper plate 14 and the lower plate 16. The vehicle 10 includes vibration isolators 20, 22, including a first vibration isolator 20 and a second vibration isolator 22, between the vehicle-battery enclosure 12 and the vehicle battery 18. The first vibration isolator 20 is between vehicle battery 18 and the upper plate 14. The second vibration isolator 22 is between the vehicle battery 18 and the lower plate 16. Each of the vibration isolators 20, 22 includes a coil spring 24 and a molded portion 26 encasing the coil spring 24. The molded portion 26 is elastomeric polymer.

The vibration isolators 20, 22 manage energy and movement of the vehicle battery 18 inside the vehicle-battery enclosure 12 during operation of the vehicle 10. Specifically, the vibration isolators 20, 22 may be designed to isolate the vehicle-battery from road vibration. The vibration isolators 20, 22 may manage energy laterally, e.g., along a vehicle-longitudinal axis L and a cross-vehicle axis C related to sudden acceleration or deceleration of the vehicle 10. Specifically, the molded portions 26 being an elastomeric polymer allow the vibration isolators 20, 22 to manage energy laterally. The vibration isolators 20, 22 may manage energy vertically, e.g., along a vertical axis V of the vehicle 10 related to road vibration. Specifically, the coil springs 24 being compressible along the vertical axis V of the vehicle 10 allows the vibration isolators 20, 22 to manage energy along the vertical axis V. The vibration isolators 20, 22 are under compression between the vehicle battery 18 and the vehicle-battery enclosure 12 to manage energy and movement of the vehicle battery 18.

With reference to FIG. 1, the vehicle 10 may be any suitable type of automobile, e.g., a passenger or commercial automobile such as a sedan, a coupe, a truck, a sport utility, a crossover, a van, a minivan, a taxi, a bus, etc. The vehicle 10 includes the vehicle battery 18, e.g., an electric-vehicle battery that powers propulsion of the vehicle 10, e.g., the vehicle 10 may be battery-electric (BEV), hybrid electric, plug-in hybrid electric (PHEV), etc. Operations, systems, and methods described herein should always be implemented and/or performed in accordance with an applicable owner's/user's manual and/or safety guidelines.

The vehicle 10 includes a vehicle frame 28. The vehicle frame 28 may be of a unibody construction in which the vehicle frame 28 is unitary with a vehicle body 30 (including frame rails, pillars, roof rails, etc.). As another example, the vehicle body 30 and the vehicle frame 28 may have a body-on-frame construction (also referred to as a cab-on-frame construction) in which the vehicle body 30 and the vehicle frame 28 are separate components, i.e., are modular, and the vehicle body 30 is supported on and affixed to the vehicle frame 28. Alternatively, the vehicle frame 28 and the vehicle body 30 may have any suitable construction. The vehicle frame 28 and the vehicle body 30 may be of any suitable material, for example, steel, aluminum, and/or fiber-reinforced plastic, etc.

The vehicle 10 defines the vehicle-longitudinal axis L extending between a front vehicle end (not numbered) and a rear vehicle end (not numbered) of the vehicle 10. The vehicle 10 defines the cross-vehicle axis C extending cross-vehicle from one side to the other side of the vehicle 10. The vehicle 10 defines a vertical axis V. The vehicle-longitudinal axis L, the cross-vehicle axis C, and the vertical axis V are perpendicular relative to each other.

The vehicle 10 defines a passenger compartment (not shown) to house occupants, if any, of the vehicle 10. The passenger compartment may extend across the vehicle 10, i.e., from the first side to the second side of the vehicle 10. The passenger compartment includes a front end (not numbered) and a rear end (not numbered) with the front end being in front of the rear end during forward movement of the vehicle 10.

Figure 2:
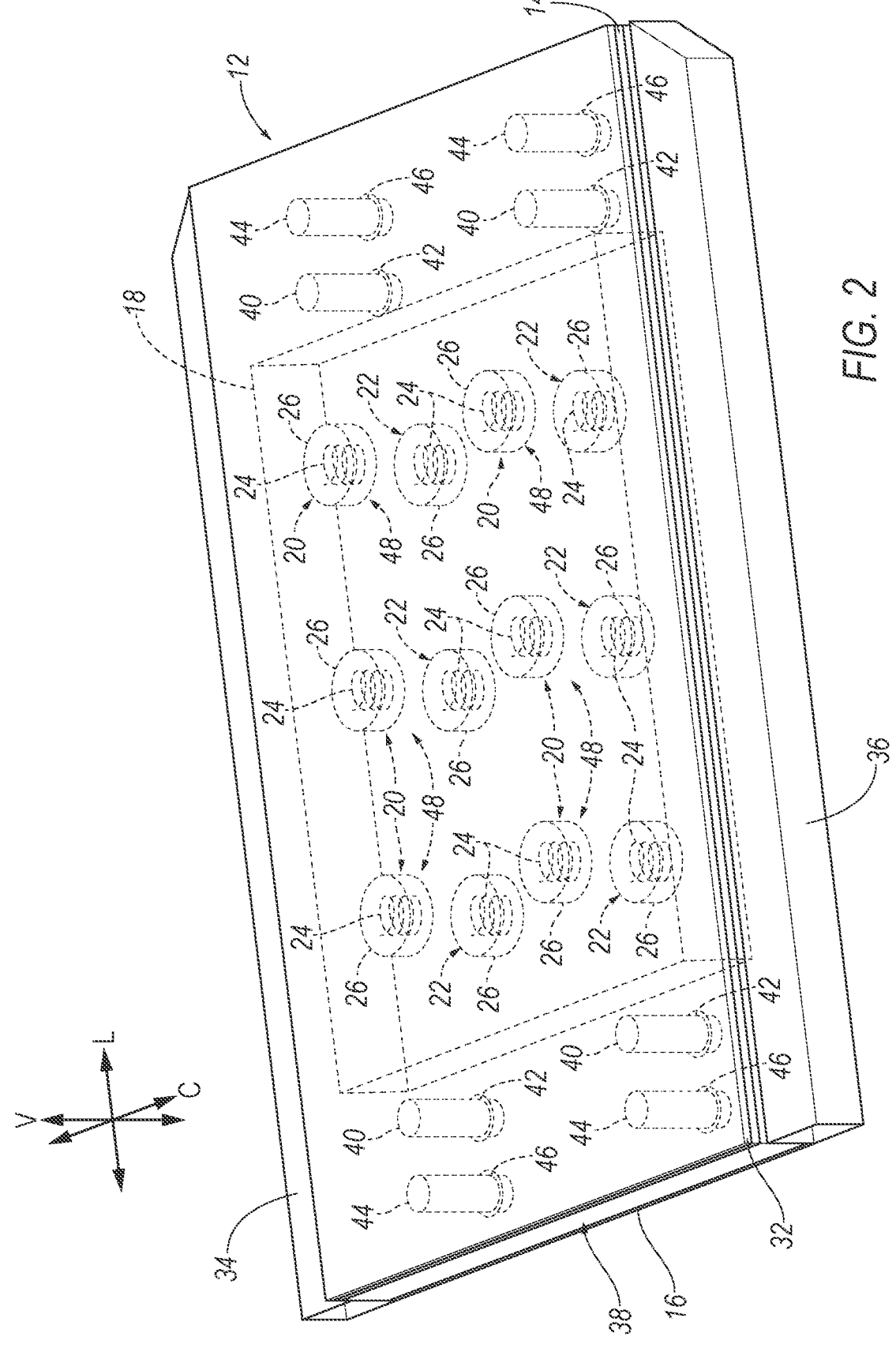
FIG. 2 is a perspective view of the vehicle-battery enclosure.
Figure 4:
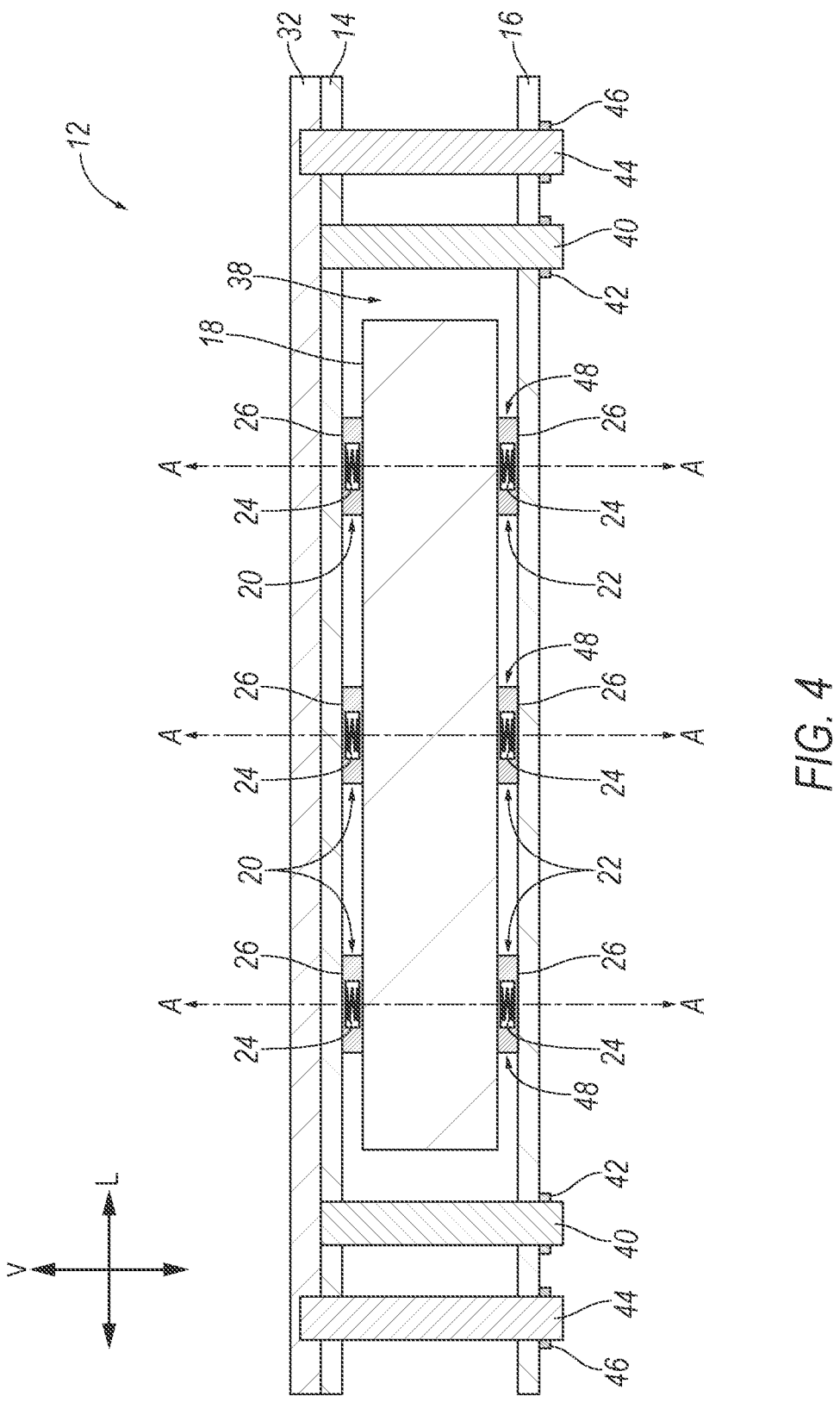
FIG. 4 is a cross-sectional view of the vehicle-battery enclosure having a first example of a vibration isolator through line 4 of FIG. 3.

With reference to FIGS. 1-2 and 4, the vehicle 10 includes a vehicle floor 32 defining the lower boundary of the passenger compartment and may extend from the front end of the passenger compartment to the rear end of the passenger compartment. The vehicle floor 32 may include upholstery, for example, carpet, and may have a class-A surface facing the passenger compartment, i.e., a surface specifically manufactured to have a high quality, finished, aesthetic appearance free of blemishes.

The vehicle frame 28 includes a plurality of rails and/or members (not all shown). Specifically, the vehicle frame 28 includes a first frame rail 34 and a second frame rail 36. The first frame rail 34 and the second frame rail 36 may be hollow. As an example, the first frame rail 34 and the second frame rail 36 may be hydroformed. The first frame rail 34 and the second frame rail 36 may be of any suitable material, for example, steel, aluminum, and/or fiber-reinforced plastic, etc.

The first frame rail 34 and the second frame rail 36 are spaced from each other along the cross-vehicle axis C. Specifically, the first frame rail 34 and the second frame rail 36 may define the vehicle-outboard boundaries of the vehicle frame 28. The first frame rail 34 may be elongated along the first side of the vehicle 10 and the second frame rail 36 may be elongated along the second side of the vehicle 10. The first frame rail 34 and the second frame rail 36 may be aligned cross-vehicle with wheel wells and wheels of the vehicle 10, i.e., extending from one wheel well to another wheel well on a common side of the vehicle 10. The first frame rail 34 and the second frame rail 36 are elongated along the vehicle-longitudinal axis L. The first frame rail 34 and the second frame rail 36 may be elongated at least from one wheel well to another wheel well. In addition, the first frame rail 34 and the second frame rail 36 may extend forward of a front wheel well (not numbered) and rearward of a rear wheel well (not numbered), e.g., by extending inboard and/or above the wheel well.

The frame rails 34, 36 are elongated along the vehicle-longitudinal axis L. The frame rails 34, 36 may be elongated at least from one wheel well to another wheel well. In addition, the frame rails 34, 36 may extend forward of the front wheel well and rearward of the rear wheel well, e.g., by extending inboard and/or above the wheel well.

The vehicle 10 may include rockers elongated along the vehicle-longitudinal axis L below doors of the vehicle 10 and extending along the frame rails, respectively. The rockers may be fixed to and/or supported by the frame rails, respectively. The vehicle-battery enclosure 12 is disposed between the frame rails and/or between the rockers.

Figure 3:
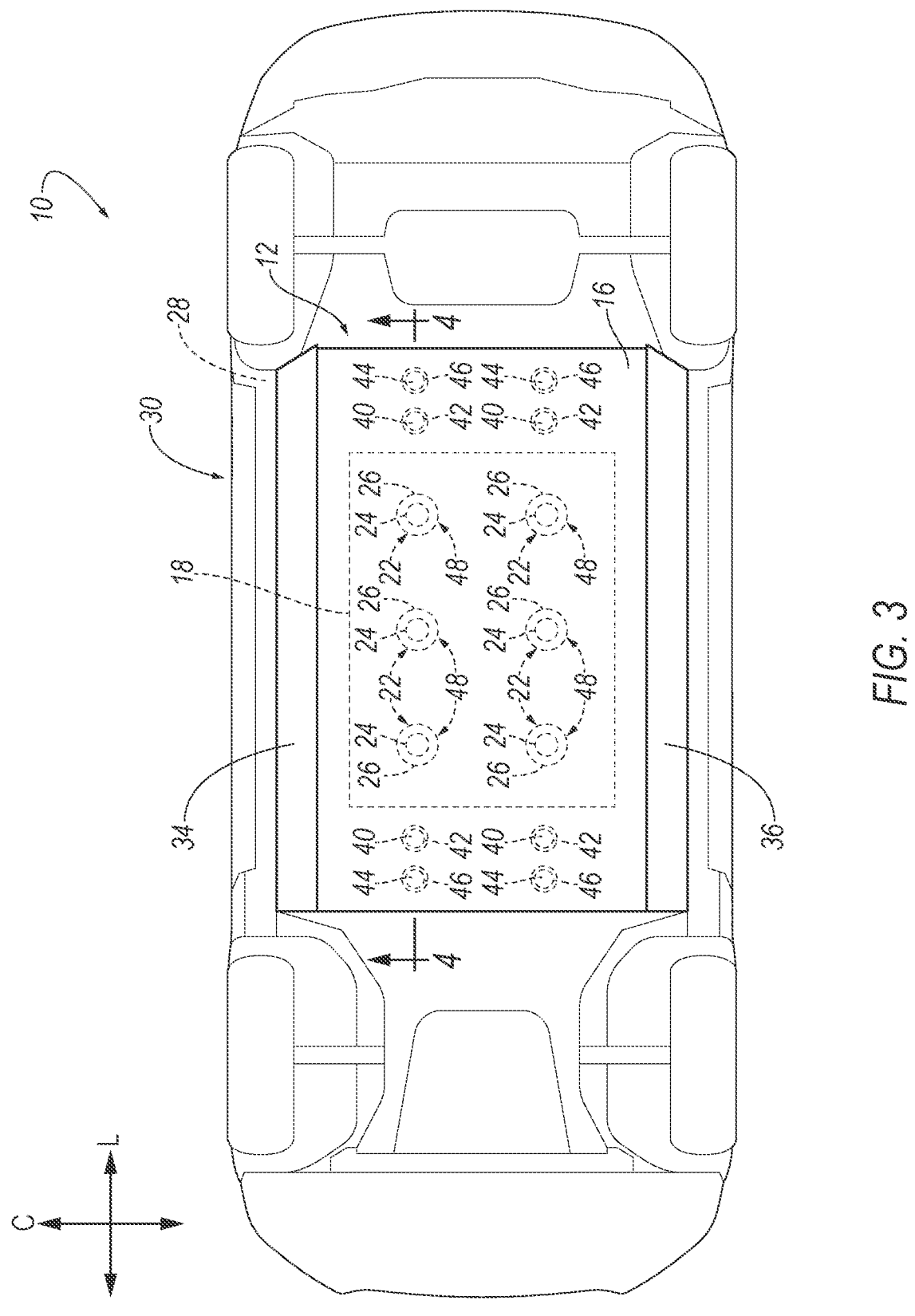
FIG. 3 is a bottom view of the vehicle and the vehicle-battery enclosure.

With reference to FIGS. 2-4, the vehicle-battery enclosure 12 defines a vehicle-battery compartment 38 that houses one or more vehicle batteries 18. In other words, the vehicle-battery enclosure 12 supports the one or more vehicle batteries 18. Specifically, the vehicle-battery compartment 38 is between the upper plate 14 and the lower plate 16. The vehicle battery 18 is in the vehicle-battery compartment 38 of the vehicle 10. In other words, the vehicle battery 18 is between the upper plate 14 and the lower plate 16. The vehicle-battery compartment 38 may be generally rectangular, or any suitable shape.

The vehicle-battery enclosure 12 is supported by the vehicle frame 28 or the vehicle body 30, e.g., by direct attachment or indirect attachment through another component. For example, as shown in the Figures, the vehicle-battery enclosure 12 may be supported by the vehicle floor 32. Specifically, in such an example, the vehicle-battery enclosure 12 is fixed to the vehicle floor 32. The vehicle-battery enclosure 12 may be fixed to the vehicle 10 as a unit. In other examples, the vehicle-battery enclosure 12 may be supported by the frame rails of the vehicle frame 28. In such an example, additionally or alternatively, one or more intermediary structures, e.g., cross-beams, brackets, etc., may fix the vehicle-battery enclosure 12 to the vehicle frame 28. The vehicle-battery enclosure 12 may be supported by any suitable component of the vehicle 10.

The vehicle-battery enclosure 12 may be plastic, metal, or any suitable material. The vehicle-battery enclosure 12 may be the lowermost component of the vehicle 10. In other words, no other components are below the vehicle-battery enclosure 12 and the vehicle-battery enclosure 12 is exposed to the driving surface below the vehicle 10. The vehicle-battery enclosure 12 is supported by the vehicle frame 28. Additionally or alternatively, one or more intermediary structures, e.g., cross-beams, brackets, etc., may fix the vehicle-battery enclosure 12 to the vehicle frame 28.

With continued reference to FIG. 2-4, the vehicle-battery enclosure 12 includes the upper plate 14 and the lower plate 16 spaced downwardly from the upper plate 14, i.e., at least a portion of the lower plate 16 is directly below the upper plate 14 along the vertical axis V with a line parallel to the vertical axis V extending through both the upper plate 14 and the lower plate 16. The upper plate 14 and the lower plate 16 may be spaced from each other along the vertical axis V. In some examples, the vehicle-battery enclosure 12 may include sides, e.g., four sides extending from the upper plate 14 to the lower plate 16 on outer peripheries of the upper plate 14 and the lower plate 16. In other examples and as described further below, the upper plate 14 and the lower plate 16 are connected to each other in other suitable ways, e.g., fasteners 40 between the plates 14, 16 and fasteners 44 between the plates 14, 16 and the vehicle floor 32. The vehicle-battery compartment 38 is defined between the upper plate 14 and the lower plate 16. The lower plate 16 may be exposed to the road surface and may prevent intrusion of precipitation and dirt to the vehicle battery 18.

As discussed above, the upper plate 14 and the lower plate 16 are connected to each other. Specifically, the upper plate 14 and the lower plate 16 are connected to each other by fasteners 40. One or more fasteners 40 may be between the upper plate 14 and the lower plate 16. In the example shown in the Figures, four fasteners 40 may be between the upper plate 14 and the lower plate 16. The upper plate 14 and the lower plate 16 are fixed relative to each other. In other words, the upper plate 14 and the lower plate 16 are fixed relative to each other by the fasteners 40 between the upper plate 14 and the lower plate 16. The fasteners 40 extend through the upper plate 14 and the lower plate 16 to fix each plate relative to the other. The fasteners 40 may be any suitable type of fasteners 40. Each of the upper plate 14 and the lower plate 16 may include holes that the fasteners 40 extend through to fix the upper plate 14 to the lower plate 16. For example, the fasteners 40 may be threaded bolts that are connectable to a nut 42 to fix the upper plate 14 to the lower plate 16. The holes may be threaded for the fasteners 40 to be connectable to the upper plate 14 and/or the lower plate 16.

As discussed above, the vehicle-battery enclosure 12 is supported by the vehicle floor 32 in the examples shown in the Figures. The upper plate 14 of the vehicle-battery enclosure 12 may be adjacent the vehicle floor 32. Specifically, the upper plate 14 may abut the vehicle floor 32. The upper plate 14 may be between the vehicle-battery compartment 38 and the upper plate 14. The upper plate 14 may be between the lower plate 16 and the vehicle floor 32. The vehicle-battery enclosure 12 is fixed to the vehicle floor 32. Specifically, the vehicle-battery enclosure 12 is fixed to the vehicle floor 32 by one or more fasteners 44. The fasteners 44 are between the vehicle-battery enclosure 12 and the vehicle floor 32. In the example shown in the Figures, four fasteners 44 are between the vehicle-battery enclosure 12 and the vehicle floor 32. The fasteners 44 may extend through the vehicle-battery enclosure 12 to the vehicle floor 32. Specifically, the fasteners 44 may extend through the upper plate 14 and the lower plate 16 to the vehicle floor 32. The upper plate 14 and the lower plate 16 may include holes that the fasteners 44 extend through to the vehicle floor 32. The fasteners 44 may be of any suitable type of fasteners 44.

For example, the fasteners 44 may be threaded bolts that are connectable to a nut 46 to fix the vehicle-battery enclosure 12 to the vehicle floor 32.

The vehicle battery 18 may be of any suitable type for vehicular electrification, i.e., for powering propulsion of the vehicle 10. For example, the vehicle battery 18 may power a drivetrain motor (not shown) of the vehicle 10. For example, the vehicle battery 18 may be lithium-ion batteries, nickel-metal hydride batteries, lead-acid batteries, or ultra-capacitors, as used in, for example, plug-in hybrid electric vehicles (PHEVs), hybrid electric vehicles (HEVs), or battery electric vehicles (BEVs). The batteries may be arranged as battery modules (not shown). In examples including multiple battery modules, adjacent ones of the battery modules are connected to each other. Each battery module may include one or more battery cells (not shown). The vehicle-battery compartment 38 receives the batteries, e.g., the battery modules. The vehicle battery 18 may include any suitable hardware, e.g., wiring, connectors, circuits, etc., connecting the vehicle battery 18 modules to each other and to electrified components of the vehicle 10.

Figures 5A, 5B:
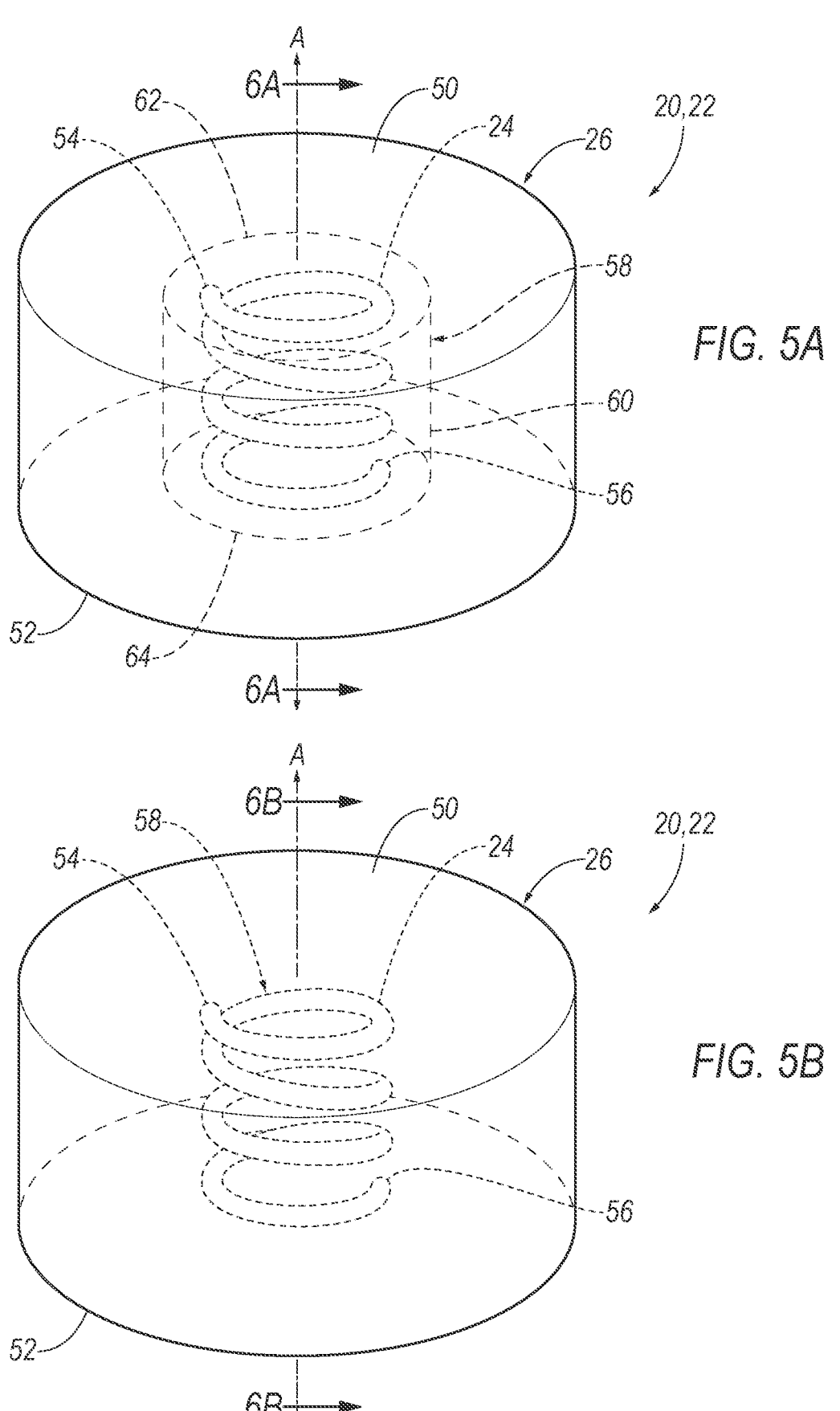
FIG. 5A is a perspective view of the first example of a vibration isolator.
FIG. 5B is a perspective view of a second example of a vibration isolator.
Figure 6A:
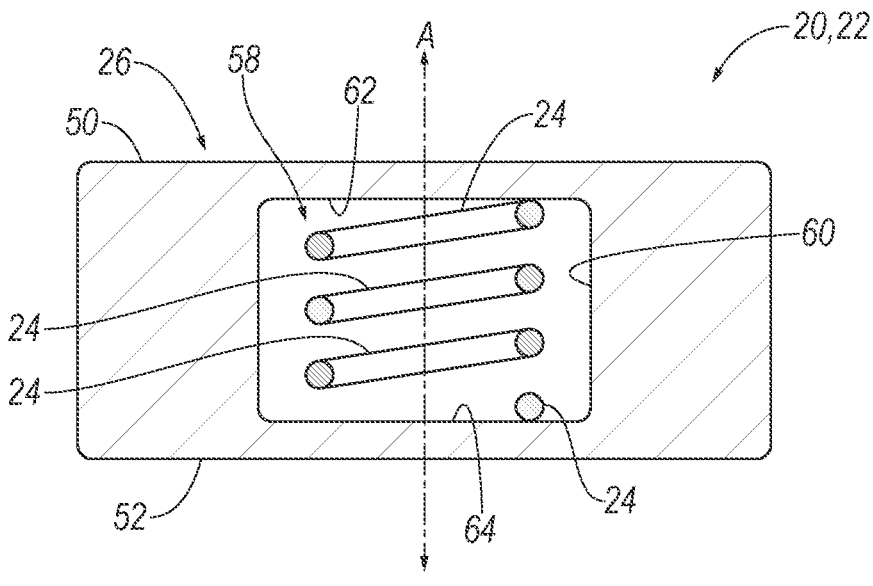
FIG. 6A is a cross-sectional view of the first example through line 6A of FIG. 5A.
Figure 6B:
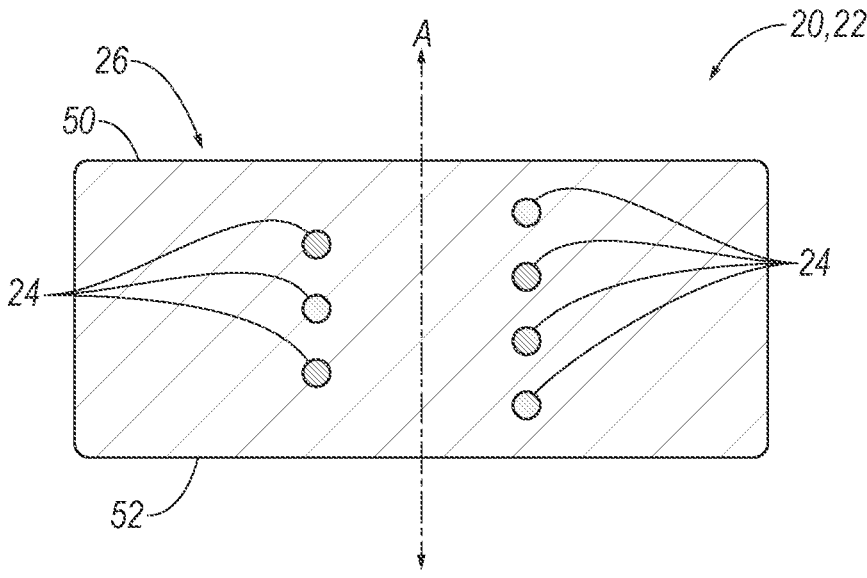
FIG. 6B is a cross-sectional view of the second example through line 6B of FIG. 5B.

With reference to FIGS. 4, 5A, and 5B, the vehicle includes vibration isolators 20, 22 between the vehicle battery 18 and the vehicle-battery enclosure 12. The vibration isolators 20, 22 manage energy and movement of the vehicle battery 18 inside the vehicle-battery compartment 38 during operation of the vehicle 10. Specifically, the vibration isolators 20, 22 may be designed to isolate the vehicle-battery from road vibration. The vibration isolators 20, 22 may manage energy laterally, e.g., along the vehicle-longitudinal axis L and the cross-vehicle axis C related to sudden acceleration or deceleration of the vehicle 10, and the vibration isolators 20, 22 may manage energy vertically, e.g., along the vertical axis V of the vehicle 10 related to road vibration. The vibration isolators 20, 22 are under compression between the vehicle battery 18 and the vehicle-battery enclosure 12 to manage energy and movement of the vehicle battery 18. As discussed further below, the vibration isolators 20, 22 are under compression by the fasteners 40 between the upper plate 14 and the lower plate 16.

The vehicle 10 includes two or more vibration isolators 20, 22 between the vehicle battery 18 and the vehicle-battery enclosure 12. One or more vibration isolators 20, 22 are between the upper plate 14 and the vehicle battery 18 and one or more vibration isolator are between the lower plate 16 and the vehicle battery 18. In other words, the vehicle battery 18 is between two vibration isolators 20, 22.

With reference to FIGS. 4, 5A, and 5B, the vibration isolators 20, 22 may be grouped into pairs of vibration isolators 48 with each pair of vibration isolators 48 including a first vibration isolator 20 between the vehicle battery 18 and the upper plate 14 and a second vibration isolator 22 between the vehicle battery 18 and the lower plate 16. In other words, the vehicle battery 18 is between each pair of vibration isolators 48. As discussed above, one or more vibration isolator is between the vehicle battery 18 and the upper plate 14. The upper plate 14 is between the vehicle floor 32 and the first vibration isolator 20. Specifically, along an axis A, the upper plate 14 is between the vehicle floor 32 and the first vibration isolator 20. The first vibration isolator 20 is between the vehicle battery 18 and the vehicle floor 32 along the axis A. As discussed above, one or more vibration isolator is between the vehicle battery 18 and the lower plate 16. The vehicle battery 18 is between the vehicle floor 32 and second vibration isolator 22 along the axis A.

The example shown in the Figures includes six pairs of vibration isolators 48. Specifically, the example shown in the Figures includes six vibration isolators 20, 22 between the vehicle battery 18 and the upper plate 14 and six vibration isolators 20, 22 between the vehicle battery 18 and the lower plate 16. In other words, the example shown in the Figures includes six first vibration isolators 20 and six second vibration isolators 22. Each of the pairs of vibration isolators 48 are spaced from each other along the vehicle battery 18. The vibration isolators 20, 22 may be arranged in a matrix pattern. In the example shown in the Figures, the vibration isolators 20, 22 may be arranged in a matrix pattern including two rows and three columns. In other words, the pairs of vibration isolators 48 may be spaced from each other along the vehicle-longitudinal axis L and along the cross-vehicle axis C. The vibration isolators 20, 22 may be arranged in any suitable pattern dependent on the size and shape of the vehicle battery 18.

In the examples shown in the Figures, the vibration isolators 20, 22 are of a cylindrical shape. Each pair of vibration isolators 48 may be aligned along the axis A that extends along the vertical axis V of the vehicle 10. In other words, the first vibration isolator 20 and the second vibration isolator 22 of each pair are aligned with each other along the axis A. The cylindrical shapes of each pair of vibration isolators 48 are axial to the axis A.

The vehicle battery 18 is spaced from the vehicle-battery enclosure 12 by the vibration isolators 20, 22. Specifically, the vehicle battery 18 is spaced from the upper plate 14 and the lower plate 16 by the vibration isolators 20, 22. In other words, the vehicle battery 18 is spaced from the upper plate 14 by the first vibration isolators 20 and the vehicle battery 18 is spaced from the lower plate 16 by the second vibration isolators 22. Each of the vibration isolators 20, 22 abuts the vehicle battery 18 and one of the upper plate 14 or the lower plate 16. In other words, the first vibration isolators 20 contact the vehicle battery 18 and the upper plate 14 and the second vibration isolators 22 contact the vehicle battery 18 and the lower plate 16.

With reference to FIG. 4, the fasteners 40, 44, both the fasteners 40 between the plates 14, 16 and the fasteners 44 between the vehicle floor 32 and the vehicle-battery enclosure 12, are spaced from the vibration isolators 20, 22. In other words, the fasteners 40, 44 may be spaced from vibration isolators 20, 22 along the vehicle-longitudinal axis L. The vibration isolators 20, 22 and the vehicle battery 18 are between the fasteners 40, 44 along the vehicle-longitudinal axis L.

The vibration isolators 20, 22 are in compression. Specifically, the vibration isolators 20, 22 are in compression between the vehicle battery 18 and the vehicle-battery enclosure 12. The first vibration isolators 20 are in compression between the upper plate 14 and the vehicle battery 18. The second vibration isolators 22 are in compression between the lower plate 16 and the vehicle battery 18. The vibration isolators 20, 22 are in compression by the fasteners 40 between the upper plate 14 and the lower plate 16. In other words, the fasteners 40 between the upper plate 14 and the lower plate 16 are tightened to a predetermined position to maintain compression in the vibration isolators 20, 22. Because the vibration isolators 20, 22 are in compression between the vehicle-battery enclosure 12 and the vehicle battery 18, the vehicle battery 18 is suspended between the upper plate 14 and the lower plate 16. Specifically, the vehicle battery 18 is suspended between the upper plate 14 and the lower plate 16 by the vibration isolators 20, 22. The suspension maintains spacing between vehicle battery 18 and the vehicle-battery enclosure 12, e.g., the upper plate 14 and the lower plate 16. In other words, vehicle battery 18 is spaced from both the upper plate 14 and the lower plate 16 by the vibration isolators 20, 22. The weight of the vehicle battery 18 is borne by the vibration isolators 20, 22 between the upper plate 14 and the lower plate 16.

Each of the vibration isolators 20, 22 includes a coil spring 24 and a molded portion 26. The coil spring 24 and the molded portion 26 are compressible between the vehicle battery 18 and the vehicle-battery enclosure 12. The coil spring 24 and the molded portion 26 are compressible along the axis A between the vehicle battery 18 and the vehicle-battery enclosure 12. The compressibility of the coil spring 24 and the molded portion 26 allow management of energy between the vehicle battery 18 and the vehicle-battery enclosure 12 and isolate any road vibrations.

The molded portion 26 of the each of the vibration isolators 20, 22 is between the vehicle-battery enclosure 12 and the vehicle battery 18. Specifically, the molded portion 26 extends from the vehicle-battery enclosure 12 to the vehicle battery 18. Each of the molded portions 26 includes a first end 50 and a second end 52. The first end 50 of the molded portions 26 is at the vehicle-battery enclosure 12 and the second end 52 is at the vehicle battery 18. In other words, the molded portions 26 extend from the first end 50 adjacent the vehicle-battery enclosure 12 to the second end 52 adjacent the vehicle battery 18. The first end 50 of each of the molded portions 26 abuts the vehicle-battery enclosure 12 and the second end 52 of each of the molded portions 26 abuts the vehicle battery 18. In other words, the molded portions 26 contact each of the vehicle-battery enclosure 12 and the vehicle battery 18 at the first end 50 and the second end 52.

The molded portion 26 of the first vibration isolator 20 of each pair of vibration isolators 48 is between the upper plate 14 of the vehicle-battery enclosure 12 and the vehicle battery 18. Specifically, the molded portions 26 of the first vibration isolators 20 abut the upper plate 14 and the vehicle battery 18. The first end 50 of the molded portions 26 of the first vibration isolators 20 abut the upper plate 14 and the second end 52 of the molded portions 26 of the first vibration isolators 20 abut the vehicle battery 18. In other words, the first end 50 of the molded portions 26 is spaced from the vehicle battery 18 and the second end 52 of the molded portions 26 is spaced from the upper plate 14 of the vehicle-battery enclosure 12.

The molded portion 26 of the second vibration isolator 22 of each pair of vibration isolators 48 is between the lower plate 16 of the vehicle-battery enclosure 12. Specifically, the molded portions 26 of the second vibration isolators 22 abut the lower plate 16 and the vehicle battery 18. The first end 50 of the molded portions 26 of the second vibration isolators 22 abut the lower plate 16 and the second end 52 of the molded portions 26 of the second vibration isolators 22 abut the vehicle battery 18. In other words, the first end 50 of the molded portions 26 is spaced from the vehicle battery 18 and the second end 52 of the molded portions 26 is spaced from the lower plate 16 of the vehicle-battery enclosure 12. The molded portions 26 of the first vibration isolators 20 are between the coil springs 24 and the upper plate 14, e.g., along the axis A. Specifically, the coil springs 24 are spaced from the upper plate 14 by the molded portions 26 along the axis A. The molded portions 26 extend along the axis A from the upper plate 14 to the coil springs 24. The molded portions 26 of the second vibration isolators 22 are between the coil springs 24 and the lower plate 16, e.g., along the axis A. Specifically, the coil springs 24 are spaced from the lower plate 16 by the molded portions 26 along the axis A. The molded portions 26 extend along the axis A from the lower plate 16 to the coil springs 24.

The coil springs 24 include an upper end 54 and a lower end 56. The upper end 54 of the coil springs 24 may be adjacent the first end 50 of the molded portions 26 and the lower end 56 of the coil spring 24 may be adjacent the second end 52 of the molded portions 26. As the vibration isolators 20, 22 compress, the upper end 54 and the lower end 56 of the coil springs 24 may move closer in proximity to each other and the first end 50 and the second end 52 of the molded portions 26 may move closer in proximity to each other. The ends of the coil spring 24 and the ends of the molded portions 26 may offset from each other during any lateral movement of the vehicle battery 18. In other words, for example, in situations where the vehicle battery 18 moves along the vehicle-longitudinal axis L or the cross-vehicle axis C, the ends of the coil spring 24 and the ends of the molded portions 26 may offset from each other.

The molded portions 26 of the vibration isolators 20, 22 encase the coil spring 24. The molded portions 26 surround the coil springs 24 in all directions. In other words, the coil springs 24 are completely surrounded by the molded portions 26. The coil springs 24 are inside the molded portions 26 of the vibration isolators 20, 22. Specifically, the molded portions 26 define a cavity 58 that houses the coil spring 24. In other words, the coil springs 24 are inside the cavity 58 defined by the molded portions 26. Specifically, the cavity 58 is the space inside the molded portions 26 that is occupied by the coil spring 24. Two examples of the vibration isolators 20, 22 are shown in FIGS. 5A and 5B. In the example shown in FIG. 5A, the cavity 58 includes a side wall 60 as described below. In the example shown in FIG. 5B, the coil springs 24 are overmolded by the molded portions 26 as described below.

In the example shown in FIG. 5A, the cavity 58 includes a side wall 60 terminating at an upper end 62 and a lower end 64. The cavity 58 may be of a cylindrical shape inside the molded portions 26. Specifically, the side wall 60 defines the curved surface of the cylindrical shape and the upper end 62 and the lower end 64 each define bases of the cylindrical shape. The coil spring 24 is spaced from the side wall 60 by the cavity 58. The cylindrical shape of the cavity 58 is concentric with the cylindrical shape of the molded portion 26. In other words, the cylindrical shape of the cavity 58 is axial with the axis A. The upper end 54 and the lower end 56 of the coil spring 24 are between the upper end 62 and the lower end 64 of the cavity 58. Specifically, the upper end 54 of the coil spring 24 is at the upper end 62 of the cavity 58 and the lower end 56 of the coil spring 24 is at the lower end 64 of the cavity 58. The coil spring 24 is compressible between the upper end 62 of the cavity 58 and the lower end 64 of the cavity 58.

In the example shown in FIG. 5B, the coil springs 24 may be overmolded by the molded portions 26. In this example, the molded portions 26 may be injection molded plastic and the molded portions 26 may be plastic molded over the coil springs 24. In other words, the molded portions 26 may encompass, i.e., be molded around, the coil springs 24. In other words, in this example, the cavity 58 of the molded portions 26 are the space in the molded portions 26 that is encompassed by the coil springs 24. In such an example the cavity 58 matches the shape of the coil spring 24, i.e., is helical in the example shown in FIG. 5B. The molded portions 26 are fixed to the coil springs 24 without fasteners or adhesives holding the coil springs 24 inside the molded portions 26.

In both of examples discussed above, when the vibration isolators 20, 22 are between the vehicle-battery enclosure 12 and the vehicle battery 18, the molded portions 26 are between the vehicle-battery enclosure 12 and the coil spring 24 and the molded portions 26 are between the vehicle battery 18 and the coil spring 24. Specifically, along the axis A, the molded portions 26 are between the vehicle-battery enclosure 12 and the coil spring 24 and the molded portions 26 are between the vehicle battery 18 and the coil spring 24. In other words, because the molded portions 26 completely surround the coil springs 24, the molded portions 26 are between the coil springs 24 and the vehicle-battery enclosure 12 and the molded portions 26 are between the coil springs 24 and the vehicle battery 18.

The molded portions 26 are between the coil springs 24 and the remainder of the vehicle-battery compartment 38. Specifically, the molded portions 26 is between the coil springs 24 and the void that is the vehicle-battery compartment 38. The molded portions 26 may surround the coil springs 24 on all sides such that the molded portions 26 are between the coil springs 24 and the vehicle-battery compartment 38.

As discussed above, the vibration isolators 20, 22 are in compression. Specifically, the molded portions 26 and the coil springs 24 are in compression. The molded portions 26 and the coil springs 24 are in compression between the vehicle battery 18 and the vehicle-battery enclosure 12. The molded portions 26 and the coil springs 24 of the first vibration isolators 20 are in compression between the upper plate 14 and the vehicle battery 18. The molded portions 26 and the coil springs 24 of the second vibration isolators 22 are in compression between the lower plate 16 and the vehicle battery 18. The molded portions 26 and the coil springs 24 are compressible along the axis A. The molded portions 26 and the coil springs 24 are in compression by the fasteners 40 between the upper plate 14 and the lower plate 16. In other words, the fasteners 40 between the upper plate 14 and the lower plate 16 are tightened to a predetermined torque to maintain compression of the molded portions 26 and the coil springs 24. The vehicle battery 18 is suspended between the upper plate 14 and the lower plate 16 by the molded portions 26 of the vibration isolators 20, 22.

The molded portions 26 are an elastomeric polymer. For example, the molded portions 26 may be synthetic rubber, such as a silicone-based rubber, polyurethan, etc. The molded portions 26 may be any suitable elastomeric polymer to isolate road vibrations from the vehicle battery 18. The coil spring 24 may be of any suitable material, e.g., steel, aluminum, etc.

The disclosure has been described in an illustrative manner, and it is to be understood that the terminology which has been used is intended to be in the nature of words of description rather than of limitation. The numerical adverbs "first" and "second" are used herein merely as identifiers and do not signify order or importance. Many modifications and variations of the present disclosure are possible in light of the above teachings, and the disclosure may be practiced otherwise than as specifically described.

What is claimed is:

1. A vehicle comprising:
   a vehicle-battery enclosure including an upper plate and a lower plate spaced downwardly from the upper plate;
   a vehicle battery between the upper plate and the lower plate;
   vibration isolators, including a first vibration isolator and a second vibration isolator, between the vehicle-battery enclosure and the vehicle battery;

the first vibration isolator being between the vehicle battery and the upper plate;

the second vibration isolator being between the vehicle battery and the lower plate; and each of the vibration isolators including a coil spring and a molded portion encasing the coil spring, the molded portion being elastomeric polymer;

the vibration isolators being in compression between the vehicle battery and the vehicle-battery enclosure; and a fastener between the upper plate and the lower plate, the vibration isolators being in compression by the fastener.

2. The vehicle of claim 1, wherein the molded portions of the vibration isolators define a cavity, the coil springs being inside the cavities, respectively.

3. The vehicle of claim 2, wherein each cavity has a side wall terminating at an upper end and a lower end and surrounding the coil spring, the respective coil spring having an upper end and a lower end, the upper end and lower end of the coil spring being between the upper end and the lower end of the cavity.

4. The vehicle of claim 1, wherein the coil springs are overmolded by the molded portions, respectively.

5. The vehicle of claim 1, wherein the molded portion of the first vibration isolator is between the upper plate and the coil spring of the first vibration isolator and the molded portion of the second vibration isolator is between the lower plate and the coil spring of the second vibration isolator.

6. The vehicle of claim 1, wherein the vehicle-battery enclosure defines a vehicle-battery compartment between the upper plate and the lower plate, the molded portions of the vibration isolators being between the vehicle-battery compartment and the coil springs of the vibration isolators.

7. The vehicle of claim 1, wherein the molded portions of the vibration isolators abut the vehicle-battery enclosure and the vehicle battery.

8. The vehicle of claim 1, wherein the molded portion of the first vibration isolator abuts the upper plate and the vehicle battery and the molded portion of the second vibration isolator abuts the lower plate and the vehicle battery.

9. The vehicle of claim 1, further comprising a first pair of vibration isolators, including the first vibration isolator and the second vibration isolator, and a second pair of vibration isolators spaced from the first pair of vibration isolators, the second pair of vibration isolators being between the vehicle-battery enclosure and the vehicle battery.

10. The vehicle of claim 9, wherein the second pair of vibration isolators is spaced cross-vehicle from the first pair of vibration isolators.

11. The vehicle of claim 9, wherein the second pair of vibration isolators is spaced along a vehicle-longitudinal axis from the first pair of vibration isolators.

12. The vehicle of claim 1, wherein the vehicle battery is suspended between the upper plate and the lower plate by vibration isolators.

13. The vehicle of claim 1, further comprising a vehicle floor, the upper plate being between the vehicle floor and the first vibration isolator.

14. The vehicle of claim 13, wherein the first vibration isolator is between the vehicle battery and the vehicle floor and the vehicle battery is between the vehicle floor and the second vibration isolator.

15. The vehicle of claim 13, further comprising a fastener between the vehicle-battery enclosure and the vehicle floor, the vibration isolators being in compression by the fasteners.

16. The vehicle of claim 15, wherein the fasteners are spaced from the vibration isolators and the vehicle battery.

17. The vehicle of claim 15, further comprising a second fastener between the upper plate and the lower plate and a second fastener between the vehicle-battery enclosure and the vehicle floor.

18. The vehicle of claim 17, wherein:

the vehicle battery and the vibration isolators are between the fasteners and the second fasteners.

19. A vehicle comprising:

a vehicle-battery enclosure including an upper plate and a lower plate spaced downwardly from the upper plate;

a vehicle battery between the upper plate and the lower plate;

vibration isolators, including a first vibration isolator and a second vibration isolator, between the vehicle-battery enclosure and the vehicle battery;

the first vibration isolator being between the vehicle battery and the upper plate;

the second vibration isolator being between the vehicle battery and the lower plate; and each of the vibration isolators including a coil spring and a molded portion encasing the coil spring, the molded portion being elastomeric polymer;

a vehicle floor, the upper plate being between the vehicle floor and the first vibration isolator; and a fastener between the upper plate and the lower plate, the vibration isolators being in compression by the fastener.

20. The vehicle of claim 19, further comprising a fastener between the vehicle-battery enclosure and the vehicle floor, the vibration isolators being in compression by the fasteners.

\* \* \* \* \*